Aug. 21, 1951     L. HORNBOSTEL     2,564,693
DIAPHRAGM CONSTRUCTION
Filed Aug. 20, 1947
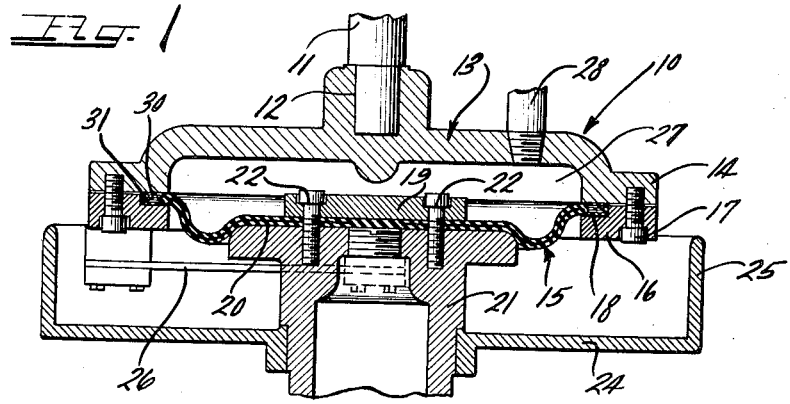
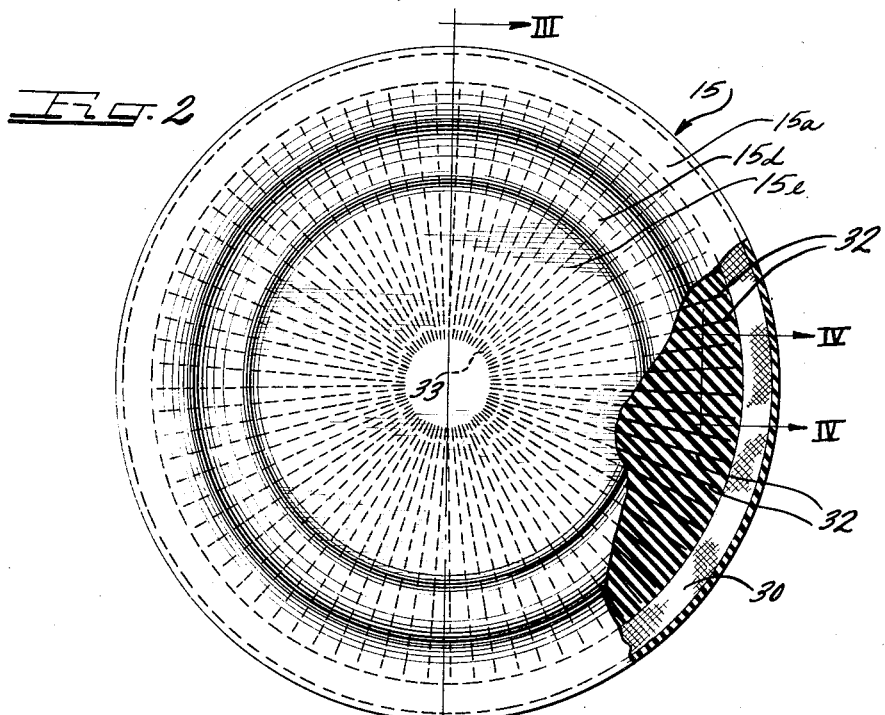
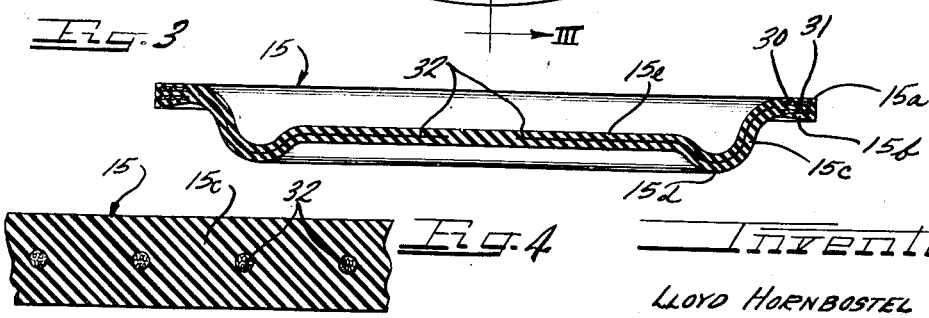
Inventor
LLOYD HORNBOSTEL Patented Aug. 21, 1951

2,564,693

UNITED STATES PATENT OFFICE 2,564,693

DIAPHRAGM CONSTRUCTION

Lloyd Hornbostel, Beloit, Wis., assignor to Beloit Iron Works, Beloit, Wis., a corporation of Wisconsin Application August 20, 1947, Serial No. 769,751

4 Claims. (Cl. 137—157)

This invention relates to diaphragms for pumps, gauges, load-transmitting devices, and the like.

Specifically the invention deals with a rubber diaphragm construction having radially extending cords embedded in the rubber in spaced relation from each other and effective to reduce diaphragm failure and increase the wear life of a diaphragm.

In my copending application, Serial No. 607,728, filed July 30, 1945 entitled: "Fluid Pressure Controlled Press Roll Assembly" there is disclosed fluid-actuated diaphragm units for loading pressure rolls and the like paper machine parts. The diaphragm constructions of this invention are especially useful in such units but are not limited to such use, being generally suitable in any installation where rubber type diaphragms are involved.

In accordance with this invention non-fibrous flexible sheet material like rubber, plastics, and the like, is molded with fiber cords embedded therein in spaced radially extending relation. The cords preferably radiate from a circle surrounding the center of the diaphragm to the periphery of the diaphragm and follow the configuration of the diaphragm. The periphery of the diaphragm can have fabric material embedded therein to form a reinforced rim for clamping in a unit.

Heretofore rubber diaphragms have been reinforced with woven fabic material but flexing of the diaphragms in operation produces a sawing action on the woven threads of the fabric. This sawing action soon weakens the fabric reinforcement and bursting of the diaphragm is likely. In addition, flexing of the diaphragm in any direction must cause stretching of some threads in a woven fabric sheet. This unduly loads the threads, causing early fatigue and resulting diaphragm failure. The present invention, on the other hand, completely eliminates sawing action because the radially extending cords are embedded in the rubber in spaced relation from each other and cannot contact each other even though the diaphragm is badly distorted. In addition, the radially extending cords are not subjected to the extensive length-changing action encountered by the threads in a woven fabric and are only subjected to radial loads producing tensile stresses therein. These tensile stresses are effectively resisted by cords since cords are best equipped to carry tensile loads. Since the cords follow the configuration of the diaphragm without being loaded during the manufacture of the diaphragm, they are not subjected to the distorting and stretching loads encountered by the fabric material during the course of manufacture of the diaphragm. Puckering, local stretching, and the like objectionable molding conditions always present in the molding of fabric material into a diaphragm, are entirely lacking in the molding of reinforcing cords arranged in accordance with the present invention.

It is, then, an object of the invention to provide a diaphragm construction reinforced with individual strands in spaced relation from each other.

Another object of the invention is to provide flexible, non-fibrous sheet material having individual cords of fibrous material such as string, rope, or the like embedded therein in spaced relationship from each other.

Another object of the invention is to provide a rubber-type diaphragm with radially extending cords embedded in the rubber in spaced relation from each other.

A further object of the invention is to provide a flexible diaphragm construction having fiber cords embedded in the sheet material of the construction and extending radially thereof from a circle surrounding the axial center of the construction to the periphery of the construction.

Another object of the invention is to provide a rubber diaphragm for paper machinery and the like composed of a sheet of rubber having individual radially extending cords embedded therein and rings of fabric material embedded therein around the periphery thereof.

Other and further objects of the invention will be apparent to those skilled in the art from the following detailed description of the annexed sheet of drawings which, by way of a preferred example only, illustrates one embodiment of the invention.

On the drawings:

Figure 1 is a vertical cross-sectional view of a roll-loading diaphragm unit of the type disclosed in my aforesaid copending application Serial No. 607,728 but equipped with a rubber diaphragm in accordance with this invention.

Figure 2 is a plan view of the diaphragm of the unit of Figure 1 with a part cut away and shown in horizontal cross section to illustrate embedded material in the diaphragm.

Figure 3 is a diametric cross-sectional view of the diaphragm taken along the line III—III of Figure 2.

Figure 4 is an enlarged fragmentary cross-sectional view of the diaphragm taken along the line IV—IV of Figure 2.

As shown on the drawings:

In Figure 1 the diaphragm unit 10 is of the type disclosed in my aforesaid copending application Serial No. 607,728 and includes a jack rod 11 seated in a socket 12 of a top casing member 13. This casing member 13 has an annular flange 14 therearound. A diaphragm 15 of this invention is preferably clamped against the bottom face of the casing 13 by means of a clamping ring 16 attached to the flange 14 by screws 17. The ring 16 has a recess 18 in its top face around the inner periphery thereof receiving the outer peripheral margin of the diaphragm 15.

The central portion of the diaphragm 15 is clamped between a disk 19 and the disk face 20 of a post member 21. Screws such as 22 extend through the disk 19, the diaphragm 15, and the upper portion of the post 21. A flanged plate 24 is carried by the post and has an upwardly directed peripheral flange 25 circumscribing the casing 13. A spring assembly composed of flat leaf springs such as 26 is secured to the ring 16 and to the post 21. The spring maintains the casing 13 centered relative to the post 21 and plate 24.

Fluid such as air under pressure is admitted to the chamber 27 above the diaphragm 15 in the casing 13 by means of an inlet pipe 28.

The diaphragm 15 is loaded by air under pressure in the chamber 27 and the jack rod 11 is operated until the diaphragm assumes its normal position. The unit 10 is thereupon effective to transmit the desired loading pressure to a roll or other member attached to the post 21.

As best shown in Figures 2 and 3, the diaphragm 15 is composed of non-fibrous impervious flexible sheet material such as rubber, plastic or the like. The diaphragm 15 is circular and has a radially extending peripheral marginal portion 15a with an undercut tapered bottom face 15b. The marginal portion 15a extends inwardly to a rounded upstanding side wall portion 15c. This portion 15c continues to a semi-circular bead portion 15d. The bead portion surrounds a flat bottom 15e. The normal configuration of the diaphragm therefore is in the general shape of a flanged saucer with a raised central flat bottom portion surrounded by a groove. The flat bottom 15e is between the bottom of the bead 15d and the flange 15a.

Two flat rings 30 and 31 of woven fabric material such as canvas are imbedded in spaced superimposed relation in the flange portion 15a of the diaphragm. These fabric rings reinforce the rim of the diaphragm to provide a somewhat rigid clamp ring periphery. The tapered face 15b of the flange is deformed into a flat shape when the clamping ring 16 is tightened against it. The taper is desirable to insure firm contact between the sealing ring and diaphragm so that leakage around the periphery of the diaphragm will not occur. The diaphragm has a plurality of radially extending cords 32 embedded in the bottom 15e, the bead 15d, and the side wall 15c thereof. These cords 32 extend radially outward from a small circle 33 in the center of the flat wall 15e of the diaphragm. The cords follow the configuration of the bead 15d and side wall 15c and extend into the flange 15a but terminate in spaced relation from the fabric rings 30 and 31. As shown in Figure 3, the cords 32 are preferably midway between the faces of the diaphragm so as to be equally covered on opposite faces with diaphragm material.

As illustrated in Figures 2 and 4, the cords 32 are in spaced relation from each other and are completely surrounded by the rubber or other body material of the diaphragm.

The cords can be threads, strings, ropes, or the like twisted fibrous material capable of resisting tensile loads. Since each cord is completely isolated from another cord, no sawing of one cord on another can occur. Further, since the cords are initially molded into the shape of the diaphragm and can assume this shape without being stretched, they are not subjected to elongation or tensile loads. As the diaphragm flexes in operation, the cords are deformed only along their length and are not subject to twisting or other severing conditions.

The size of the inner circle 33 from which the cords radiate should be sufficiently large so that the inner ends of the cords do not engage each other.

In operation of the diaphragm the inner ends of the cords are clamped between the post 21 and clamping plate 19 while the outer ends of the cords are clamped between the casing 13 and the clamping ring 16. The cords thereby form a myriad of strand-like bridges between the parts of the diaphragm unit 10. These bridges only flex along their lengths during operation of the unit and are not subjected to kinking actions tending to form creases and fatigue cracks therein.

From the above descriptions it will be clear that the invention provides a diaphragm construction wherein radially extending strands or cords serve to reinforce the main body of the diaphragm without interfering with the flexibility of the body material or tending to alter the molded shape of the material.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. A diaphragm comprising a sheet of rubber having a radially extending flange portion, an upstanding side wall extending inwardly from the flange portion, a rounded bead at the bottom of the side wall and a flat bottom spaced inwardly from the side wall at a level above the bottom of the bead, cords embedded in the rubber extending radially outward from a circle at the central portion of the flat bottom through the bead and side wall into the flange but terminating short of the outer periphery of said flange, said cords being in isolated relation to each other and completely covered by the rubber material, and a fibrous ring embedded in said flange portion in close proximity to the terminal ends of said cords.

2. A diaphragm comprising a disk of rubberlike material, rings of woven fabric embedded in the peripheral margin of said material in superimposed spaced relation, and radially extending fibrous cords embedded in the body of said material extending radially outward from the central portion of the disk into closely spaced relation with the fabric rings.

3. A diaphragm comprising a sheet of rubber having a radially extending flange portion, said flange portion further including annularly shaped fabric material embedded therein, said fabric together with said flange portion constituting an integral clamping ring for said diaphragm, an upstanding wall portion extending inwardly from said flange portion, a rounded bead extending inwardly from said wall portion, a flat circular centrally disposed bottom portion spaced inwardly of said round bead and defining a plane at a level above the bottom of the bead, a plurality of radially extending cords embedded in said diaphragm and arranged in isolated spaced relationship to one another, said cords extending radially outward from points lying substantially within said flat circular bottom portion, through said bead and wall portion and extending substantially into said flange portion in closely spaced relation to said annularly shaped fabric material whereby said bottom and flange portions of said diaphragm may be clamped to form a myriad of strand-like bridges flexible along their lengths.

4. A diaphragm comprising a sheet of rubber having a radially extending flange portion, said flange portion adapted to define an undercut tapered bottom face and having annularly shaped fabric material embedded therein, said fabric material together with said flange portion constituting an integral deformable clamping ring on said diaphragm, an upstanding wall portion extending inwardly from said flange portion, a rounded bead extending inwardly from said wall portion, a flat circular centrally disposed bottom portion spaced inwardly of said round head and defining a plane at a level above the bottom of the bead, a plurality of radially extending cords embedded in said diaphragm and arranged in isolated spaced relationship to one another, said cords extending radially outward from points lying substantially within said flat circular bottom portion through said bead and wall portion and extending substantially into said flange portion but terminating short of said fabric material, whereby said bottom and flange portions of said diaphragm may be clamped to form a myriad of strand-like bridges flexible along their lengths.

LLOYD HORNBOSTEL.

REFERENCES CITED

The following references are of record in the file of this patent:

UNITED STATES PATENTS

| Number | Name | Date |
|---|---|---|
| 212,488 | Mounteney | Feb. 18, 1879 |
| 1,790,206 | Farmer | Jan. 27, 1931 |
| 2,380,983 | Mock | Aug. 7, 1945 |

FOREIGN PATENTS

| Number | Country | Date |
|---|---|---|
| 419,200 | Great Britain | of 1934 |